Sept. 19, 1967 F. A. ZOLLNER 3,342,101
GRAPHIC PROJECTOR
Filed March 26, 1965 2 Sheets-Sheet 1

INVENTOR.
FRED A. ZOLLNER
BY Whittemore,
Hulbert & Belknap
ATTORNEYS

Sept. 19, 1967      F. A. ZOLLNER      3,342,101
GRAPHIC PROJECTOR
Filed March 26, 1965      2 Sheets-Sheet 2
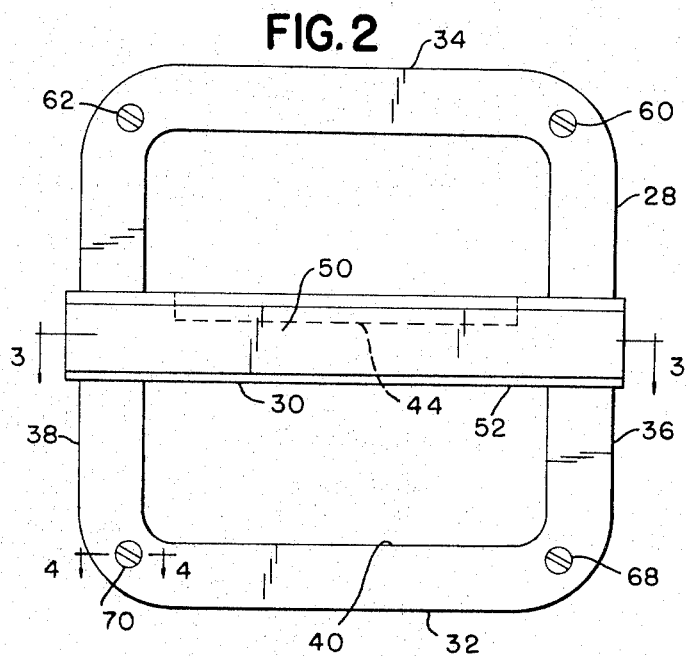
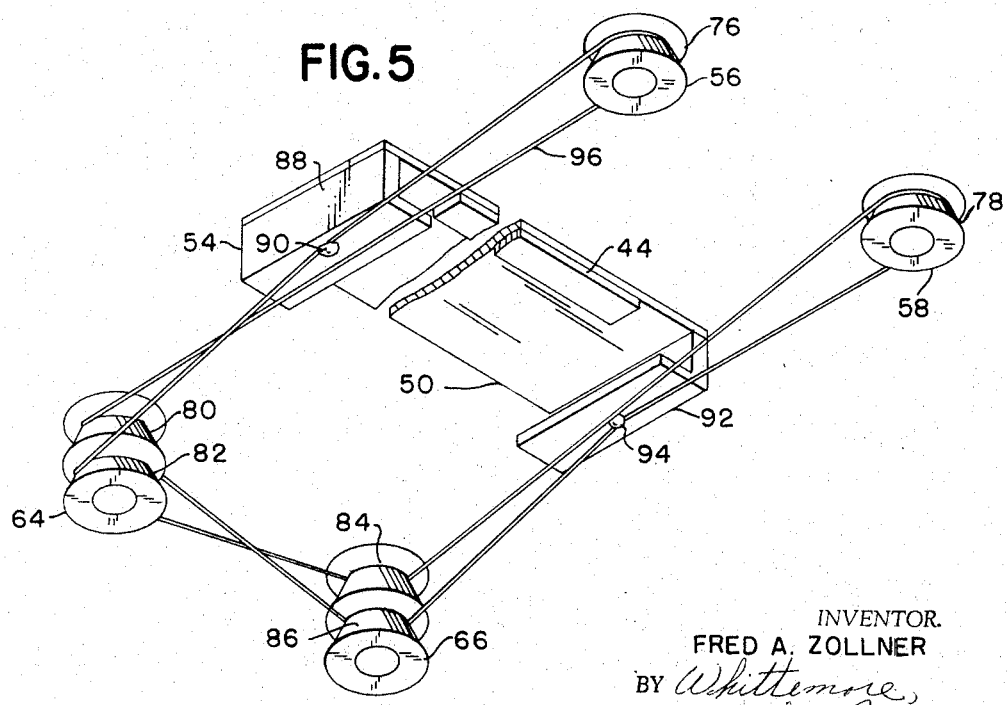
INVENTOR.
FRED A. ZOLLNER
BY Whittemore,
Hulbert & Belknap
ATTORNEYS

United States Patent Office 3,342,101
Patented Sept. 19, 1967

3,342,101
GRAPHIC PROJECTOR
Fred A. Zollner, Oscoda, Mich., assignor of one-half to Robert Richardson, Oscoda, Mich.
Filed Mar. 26, 1965, Ser. No. 443,138
8 Claims. (Cl. 88—24)

ABSTRACT OF THE DISCLOSURE

A graphic overhead projector including a light table in combination with a unitary rectangular frame for defining a drawing surface on the light table which may be readily secured to and removed from the light table of the graphic projector and a straight edge secured to the rectangular frame and means for maintaining the straight edge in parallel positions on movement of the straight edge over the light table of the graphic projector with the frame secured to the light table whereby instruction of drafting arts may be facilitated.

---

The invention relates to overhead projectors and refers more specifically to a novel drawing aid for use in combination with an overhead projector to facilitate graphic construction and projection.

Overhead projectors are now generally accepted as a valuable aid in classroom instruction. The use of overhead projectors in teaching courses such as drafting, descriptive geometry and plane and solid geometry wherein finding or presenting a solution to a given problem requires or is aided by visual representation is particularly advantageous.

Thus with an overhead projector the instructor does not need to fight gravity to maintain his drawing instruments within view of the class and the instruments are projected on a large scale in exactly the manner they appear before the individual student. Also with an overhead projector the instructor is usually out of the way of his own presentation which is sometimes impossible in making a similar presentation on a blackboard or similar vertical surface when the instructor must necessarily block at least some of the students from seeing the presentation.

The overhead projectors of the past however have included no apparatus to aid in the exact construction of a drawing. Thus the use of overhead projectors in drawing and math classes has required a considerable amount of guessing and estimating on the part of the instructor making the visual presentation. The student then is encouraged to guess and estimate in his individual work when he should be making exact constructions and drawings.

Where special equipment in the past has been provided to permit the making of exact detailed constructions in conjunction with an overhead projector, the specially built overhead projector or apparatus has been particularly complicated and expensive. Further, the special overhead projector or apparatus suitable for use in only one or two classes is often used for only a few periods a day therefore it is not usually economical for a school system to provide special overhead projectors or expensive drawing aids to facilitate graphic construction and projection.

It is therefore an object of the present invention to provide improved overhead projection structure.

Another object is to provide an overhead projector in combination with drawing aid structure for facilitating graphic construction and projection with the overhead projector.

Another object is to provide apparatus as set forth above wherein the drawing aid structure comprises a rigid frame defining a drawing opening adapted to fit over and expose the drawing surface of an overhead projector, a straight edge extending between the edges of the frame and means secured to the frame about the periphery thereof for maintaining the straight edge in parallel positions on movement of the straight edge over the drawing surface of the overhead projector.

Another object is to provide apparatus as set forth above and further including means for aligning the drawing aid structure with respect to the drawing surface of the overhead projector.

Another object is to provide apparatus as set forth above wherein the straight edge is positioned on top of the frame and includes a member secured to the bottom thereof extending into the drawing opening between the sides thereof for substantially the full depth of the frame.

Another object is to provide drawing aid structure comprising a rigid frame defining a drawing opening, a straight edge extending between the edges of the frame and means secured to the frame about the periphery thereof for maintaining the straight edge in parallel positions on the movement of the straight edge over the opening.

Another object is to provide structure as set forth above and further including means for aligning the drawing aid with respect to a drawing surface over which the frame is positioned.

Another object is to provide structure as set forth above wherein the straight edge is positioned on top of the frame and includes a member secured to the bottom thereof extending into the drawing opening between the sides thereof for substantially the full depth of the frame.

Another object is to provide overhead projector structure and a drawing aid for use therewith which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 2 is a plan view of the drawing aid structure of the invention.

FIGURE 5 is an enlarged diagrammatic representation of the apparatus for maintaining the straight edge of the drawing aid structure illustrated in FIGURE 2 parallel on movement thereof relative to the frame of the drawing aid structure.

Figure 1:
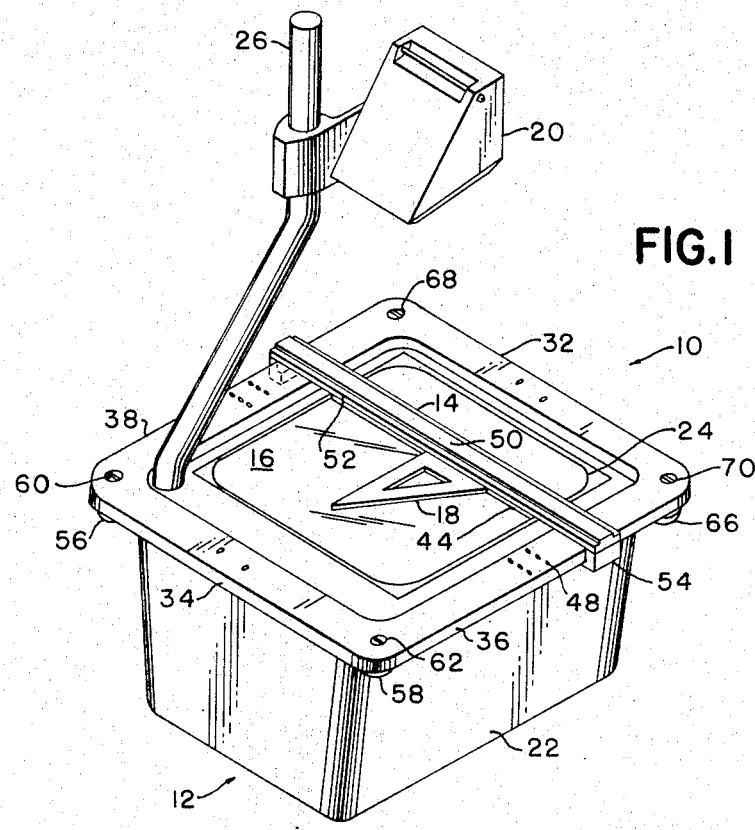
FIGURE 1 is a perspective view of an overhead projection apparatus including drawing aid structure constructed in accordance with the invention.

With particular reference to the figures of the drawing one embodiment of the invention will now be considered in detail.

As shown in FIGURE 1 the drawing aid structure 10 is in normal use position on an overhead projector 12. In use the straight edge 14 of the drawing aid 10 is aligned with the drawing surface 16 of the overhead projector 12. The usual drafting instruments such as triangle 18 are then used in conjunction with the straight edge 14 to provide exact technical drawings and constructions which are projected through the projecting head 20 of the overhead projector 12 onto a suitable vertical viewing surface.

More specifically the overhead projector 12 may be any of a number of commercially available overhead projectors. These overhead projectors usually have a light box 22, a light diffusing screen 24 secured over the top of the light box 22, a drawing surface 16 positioned over the light diffusing screen 24 and a projecting head 20 supported by convenient means such as an arm 26 over the drawing surface 16 for projecting whatever is written or placed on the drawing surface 16 onto a suitable vertical viewing surface such as a light colored wall. The projecting head 20 usually contains a plurality of focusing lenses in conjunction with a reflecting mirror positioned at substantially 45° to the drawing surface 16 of the projector. An electric light is generally provided in the light box 22 for projecting light through the light diffusing surface 24 past the drawing surface 16 and into the head 20 for change of direction and projection onto the viewing surface.

Since the overhead projectors are obtainable commercially they will not be considered in greater detail herein. For further details of a particularly overhead projector reference is made to Patent No. 3,167,999.

The drawing aid structure 10 includes the frame 28, the straight edge 30 and the apparatus 32 for holding the straight edge 30 in parallel positions during movement thereof relative to the frame 28 between the ends 32 and 34 thereof.

The frame 28 includes the sides 36 and 38 as well as the ends 32 and 34 arranged in the form of a rectangle to define a drawing area 40 as shown best in FIGURE 2. The frame 28 is intended to fit on the light box 22 shown in FIGURE 1 to outline the drawing surface 16 of the overhead projector 12. The frame 28 may be of any suitable rigid material such as wood or metal but is preferably of plastic material which may for example be clear Lucite.

Figure 3:
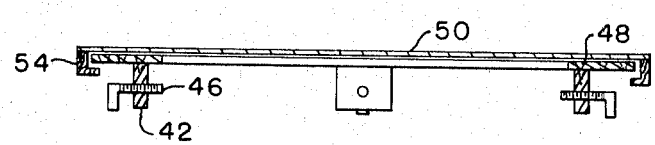
FIGURE 3 is a cross section of the drawing aid structure illustrated in FIGURE 2 taken substantially on the line 3—3 in FIGURE 2.

The drawing area 40 formed by the ends 32 and 34 and the sides 36 and 38 of the frame 28 permit positioning of the frame 28 on the top of the light box 22 over the projecting head 20 and supporting arm 26 therefor. A plurality of brackets 42 which may be adjustably positioned on the underneath side of the frame are provided to secure the frame 28 to the light box 22 in conjunction with the thumb screws 46 shown in FIGURE 3. The position of the brackets 42 may be varied transversely of the frame 28 to accommodate the drawing aid structure 10 to overhead projectors 12 having different widths. The openings 48 in the frame 28 permit varied positioning of the brackets 42 and may be provided in the ends 32 and 34 of the frame 28 if desired.

The straight edge 30 includes the usual elongated flat member 50 which may be of laminated wood, metal or plastic in accordance with the usual production of such straight edges. The normal plastic inserts 52 at the edges of the member 50 provide a straight accurate drawing edge.

The brackets 54 which are L-shaped in transverse cross section are provided at the ends of the straight edge 14 and are connected to the elongated flat member 50 by convenient means such as screws not shown to provide loose guided movement of the straight edge 50 between the ends 32 and 34 of the frame 28.

A straight edge member 44 having substantially the same depth as the frame 28 is secured to the bottom of the elongated flat member 50 and extends for substantially the entire distance between the sides 36 and 38 of the frame 28. The member 44 provides support for triangle 18 on drawing surface 16 of the projector 12 to prevent the triangle 18 from sliding under the straight edge 14 in use.

Figure 4:
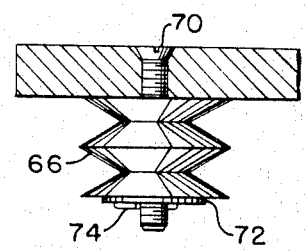
FIGURE 4 is a partial, enlarged cross section of the drawing aid structure illustrated in FIGURE 2 taken substantially on the line 4—4 in FIGURE 2.

To insure parallel movement of the straight edge 30 between the ends 32 and 34 of the frame 28 guide members 56 and 58 are secured at the end 34 of frame 28 by means of screws 60 and 62 respectively. Guide members 64 and 66 are secured to the other end 32 of the frame 28 by screws 68 and 70. All of the screws 60, 62, 68 and 70 are held in position by a washer and cotter pin such as the washer 72 and cotter pin 74 illustrated in conjunction with the screw 70 and the guide member 66 in FIGURE 4.

The guide members 56 and 58 are provided with a single groove 76 and 78 respectively therearound while the guide members 64 and 66 are provided with a pair of grooves 80 and 82 and 84 and 86 therearound as illustrated best in FIGURE 5. The guide members 56, 58, 64 and 66 may be constructed of plastic such as nylon or delron or may be metal or wood as desired.

To hold the straight edge 14 in parallel positions during movement between the ends 32 and 34 of the frame 28 a continuous linear member which may be a cord 96 for example is first secured to the end 88 of straight edge 14 by convenient means such as screw 90. The cord 96 is then passed around the guide member 56 in the groove 76 and extends longitudinally of the side 36 of the frame 28 and around the groove 80 of the guide 64 from whence it passes across the end 32 of the frame 28 and around the guide member 66 in groove 86. The cord 96 is then attached to the other end 92 of the straight edge 14 by convenient means such as screw 94 and is then continued around the guide member 58 in groove 78 back along side 38 of frame 28 and around guide member 66 in groove 84 across the end 32 of frame 28 and around guide member 64 in groove 82 and thence back to screw 90 at the end 88 of straight edge 52.

Such threading of the cord 96 around the guides 56, 58, 64 and 66 permits only parallel movement of the straight edge 14. Additionally an entirely unobstructed drawing opening 40 is provided in the frame 28.

Thus in overall use of the drawing aid structure 10 the drawing aid structure is positioned over the top of the light box 22 of overhead projector 12 and the frame 28 is adjusted by means of thumb screws 46 to provide a desired alignment of the straight edge 14 relative to the overhead projector 12. The straight edge 14 is then moved between the ends 32 and 34 of frame 28 to provide parallel reference lines for drawing construction lines on the drawing surface 16 of the overhead projector 12. The straight edge may then be used in conjunction with other drawing instruments such as triangles and the like to provide exact technical illustrations and mathematical constructions on the drawing surface 16. The exact technical illustrations and mathematical constructions are projected by the projecting head 20 onto a viewing surface in the usual manner of overhead projectors 12.

While one embodiment of the present invention has been considered in detail it will be understood that other embodiments and modifications thereof are contemplated. For example mating slot and key construction could be provided between the drawing aid structure 10 and overhead projector 12 to permit immediate and easy aligning of the frame 28 with respect to the projector 12. It is the intention to include all such embodiments and modifications as are defined by the appended claims within the scope of the invention.

What I claim as my invention is:

1. An overhead projector including a light box, and a light diffusing member and drawing surface positioned over the top of the light box, a projecting head positioned over the drawing surface for receiving light therefrom and projecting images received from the drawing surface and means supporting the projecting head from the light box and drawing aid structure including a single unitary rectangular frame removably secured over the top of the light box and outlining the complete drawing surface, a straight edge positioned over the frame for movement between the ends thereof and means for securing the straight edge to the frame for restricting movement of the straight edge to relatively parallel positions.

2. Structure as set forth in claim 1 wherein the frame of the drawing aid structure includes linear end members and linear side members in the form of a rectangle, brackets supported from at least two opposite linear members and thumb screws extending through the bracket adapted to engage the light box of the overhead projector on being tightened to position the frame on the light box.

3. Structure as set forth in claim 2 wherein the means for securing the straight edge to the frame comprises a guide member positioned at each corner of the rectangular frame and an endless linear member extending around the guide members parallel to the sides and one end of the frame and secured to the opposite ends of the straight edge to provide a substantially unobstructed drawing space outlined by the frame.

4. Structure as set forth in claim 1 wherein the straight edge includes a substantially flat elongated member positioned on top of the frame and L-shaped members secured to the opposite ends of the elongated flat member extending along the edge of and under the frame to loosely secure the straight edge to the frame.

5. Structure as set forth in claim 4 wherein the straight edge further includes a straight edge member positioned below and secured to the bottom of the flat elongated member having substantially the same depth as the frame and extending between the sides thereof.

6. Structure as set forth in claim 3 wherein the guide members at the opposite sides of one end of the frame are unitary and have a single groove therearound and the guide members at the opposite sides of the other end of the frame are also unitary and have a pair of spaced apart grooves therearound and the linear member is first connected to one side of the straight edge passed around the single groove of a guide member at one side of the one end of the frame, extends longitudinally of the one side of the frame over one of the grooves in the guide member at the other end of the frame at the one side thereof across the other end of the frame and over the opposite groove of the guide member at the opposite side and other end of the frame, then extends along the other side of the frame to be connected to the other end of the straight edge and extends around the single groove in the other guide member at the one end of the frame at the other side thereof and back along the other side of the frame over the other groove in the guide member at the other end and other side of the frame and back across the other end of the frame and over the other groove in the guide member at the one side and other end of the frame and then back to the one side of the straight edge where it is again connected, said linear member never passing substantially completely around the grooves in the guide member at the other end of the frame.

7. In combination with an overhead projector including a light box, a generally rectangular drawing surface positioned over the top of the light box and a projecting head positioned over the drawing surface, a drawing aid releasably secured to the projector over the drawing surface including a generally rectangular unitary frame outlining the drawing surface, means for releasably securing the frame to the light box, a straight edge carried by the frame and movable over the drawing surface with the frame secured to the light box and means for securing the straight edge to the frame and means for maintaining the straight edge in parallel positions during movement over the drawing surface.

8. An overhead projector including a light box, a light diffusing member and drawing surface positioned over the top of the light box, a projecting head positioned over the drawing surface for receiving light therefrom and projecting images received from the drawing surface and means supporting the projecting head from the light box and drawing aid structure including a single unitary generally rectangular frame positioned over and outlining the drawing surface, downwardly extending projections on the frame, thumb screws extending through the downwardly extending projections on the frame for securing the frame in an adjusted position with respect to the drawing surface, a straight edge extending between opposite edges of the rectangular frame, L-shaped projections connected to the bottom of the straight edge at the opposite ends thereof extending over the sides of the rectangular frame and along the bottom thereof for loosely securing the straight edge to the frame, a member positioned beneath the straight edge centrally thereof of substantially the same depth as the frame for guiding drawing instruments positioned on the drawing surface, guide means secured at the corners of the rectangular frame and endless linear means extending around the guide means and connected to the L-shaped members for maintaining the straight edge in parallel positions on movement thereof over the drawing surface.

References Cited

UNITED STATES PATENTS

| 533,387 | 1/1895 | Vielhaber | 33—80 |
| 1,175,448 | 3/1916 | Hess | 33—76 |
| 2,543,664 | 2/1951 | May | 33—80 |
| 2,805,479 | 9/1957 | Droste | 33—80 |
| 2,841,889 | 7/1958 | Coale et al. | 35—30 XR |

NORTON ANSHER, *Primary Examiner.*

R. M. SHEER, *Examiner.*